United States Patent [19]

Bass

[11] Patent Number: 5,086,465
[45] Date of Patent: Feb. 4, 1992

[54] ARMORED TELEPHONE CORD RETENTION BRACKET

[75] Inventor: Charles J. Bass, New Hope, Ala.

[73] Assignee: Quadrum Telecommunications, Inc., Arab, Ala.

[21] Appl. No.: 637,448

[22] Filed: Jan. 4, 1991

[51] Int. Cl.⁵ .................. H04M 17/00; H04M 1/00; H01R 13/58; H02G 3/18
[52] U.S. Cl. .................................. 379/438; 379/145; 379/451; 174/65 R; 174/65 G; 439/449
[58] Field of Search ............... 379/441, 438, 451, 155, 379/143, 145, 428, 437; 174/65 R, 65 G, 151; 439/449, 453, 455, 457, 458, 470

[56] References Cited

U.S. PATENT DOCUMENTS

| | | | |
|---|---|---|---|
| 4,518,830 | 5/1985 | Drexler et al. | 379/438 |
| 4,845,774 | 7/1989 | Arzounian | 174/65 R |
| 4,885,774 | 12/1989 | Brancati | 439/449 |
| 5,007,079 | 4/1991 | Vogl et al. | 379/438 |
| 5,018,185 | 5/1991 | Riddle | 379/438 |

*Primary Examiner*—James L. Dwyer
*Assistant Examiner*—Jason Chan
*Attorney, Agent, or Firm*—Robert J. Black

[57] ABSTRACT

A bracket for mounting within a telephone paystation to retain a telephone handset armored cable of the type including a central cable terminated at at least a first end in a stop secured to said cable, and with an armored sheath encircling said cable.

8 Claims, 1 Drawing Sheet

ARMORED TELEPHONE CORD RETENTION BRACKET

BACKGROUND OF THE INVENTION

1. Field of the Invention

This invention relates to armored cords that connect telephone handsets to housings of coin telephones and more particularly to brackets for retaining and/or securing the armored telephone cord within the housing of the coin telephone.

2. Background Art

Many coin telephones are located in unattended or isolated areas so as to provide reasonable and continuous access for the general public to the telephone system. Vandalism of coin telephones is frequently a problem, with the handset and cord being the most vulnerable. As a result of such vandalism, out of service conditions may result from damage sustained by the cord due to pulling and stretching of the outer protective covering when subjected to unusually large forces. Such forces frequently result in the cord and handset being completely removed from the coin telephone housing.

In recent years it has become traditional to protect the handset cords of coin telephones by armoring the cord with helically wound metal having adjacent interlocking helicies similar to the BX or Greenfield armor. The outer covered armor sheath allows the cord radially over small radii. The outer sheath is also designed to be highly resistant to penetration or cutting by sharp objects. Additional strengths to overcome any strain likely is to be caused by an unusually large longitudinal force in the handset or cord is provided by internal cable which secures the handset to the housing. This arrangement is taught by U.S. Pat. No. 4,518,830 which issued to Leonard H. Drexler et al on May 21, 1985. The current standard generally in use is quite similar to that described in the Drexler et al patent. In such as system, a 3/32" diameter stranded cable having a tinsel strength of approximately 800 pounds or more is used to mechanically connect the handset to the coin telephone housing. The stranded cable utilized is flexible and together with the signal wires is sheathed in the above noted flexible telephone cord armor between the handset and the coin telephone housing. One end portion of the telephone cord armor includes cables and wires extends within the handset, the other end being secured within the telephone housing. The Drexler et al patent fails to recognize a particular problem inherent in the utilization of armored telephone cord as utilized in coin telephones. In those arrangements where only the internal cable is anchored, the armored sheath can also be loosened to cause damage to the telephone by application of longitudinal forces. Various techniques have been devised for procuring the armored cable within the telephone handset and within the housing of the coin telephone itself.

Plainly it is the object of the present invention to provide a new retention bracket for securely anchoring an armored telephone cable and an armored telephone cord within a coin telephone housing.

SUMMARY OF THE INVENTION

The present invention consists of a newly designed retention bracket for securing an armored telephone cable within a coin telephone housing. A bracket which is intended for easily installation or removal is constructed of cold rolled steel and is secured by means of a single simple knurled head finger screw to the coin telephone dial housing. It also hooks into a tab in the rear of the dial housing. The bracket includes in its base a U-shaped portion so sized as to permit the armored cable to pass through the U-shaped area to grasp or encircle the outer sheath of the armored cable. The armored sheath is crimped at this point, or swaged, and the U-shaped portion may be secured directly to it and providing a firm retention grip on the armored cable itself. The retention bracket includes a second surface parallel with the base that secures the armored cable portion with a slot therein to which the internal cable may be passed with a stop usually attached to the end of the armored cable engaging that parallel surface providing a secure point for anchoring the internal cable of the armored telephone cord.

In a vertical portion of the bracket parallel to that portion to which the armored sheath is anchored, a round opening is provided as well as a slot extending to it and also extending to the slot in the upper surface parallel to the base surface. The round opening in the vertical portion of the bracket facilitates the passage of the stop on the end of the cable through the bracket and allowing it to be positioned up and over and into the slot on that surface parallel to the base. Thus, any direct longitudinal pressure applied to the armored telephone cord acts only to provide pressure directly against the vertical surface of the retention bracket preventing it from being pulled out of the coin telephone housing. The angular projection extending upward from the upper vertical surface has located thereon a hook shaped protuberance at an end distant from the horizontal surface is intended to lock into the portion of the coin telephone dial unit.

By virtue of the arrangement shown, strain relief is provided for substantial retention of the armored cord and particularly to its exterior sheath and internal cable within the confines of the housing of a coin telephone are provided.

BRIEF DESCRIPTION OF THE DRAWINGS

The invention and its mode of operation will be more clearly understood from the following detailed description when read with the appended drawings in which.

DESCRIPTION OF THE PREFERRED EMBODIMENT

Figure 1:
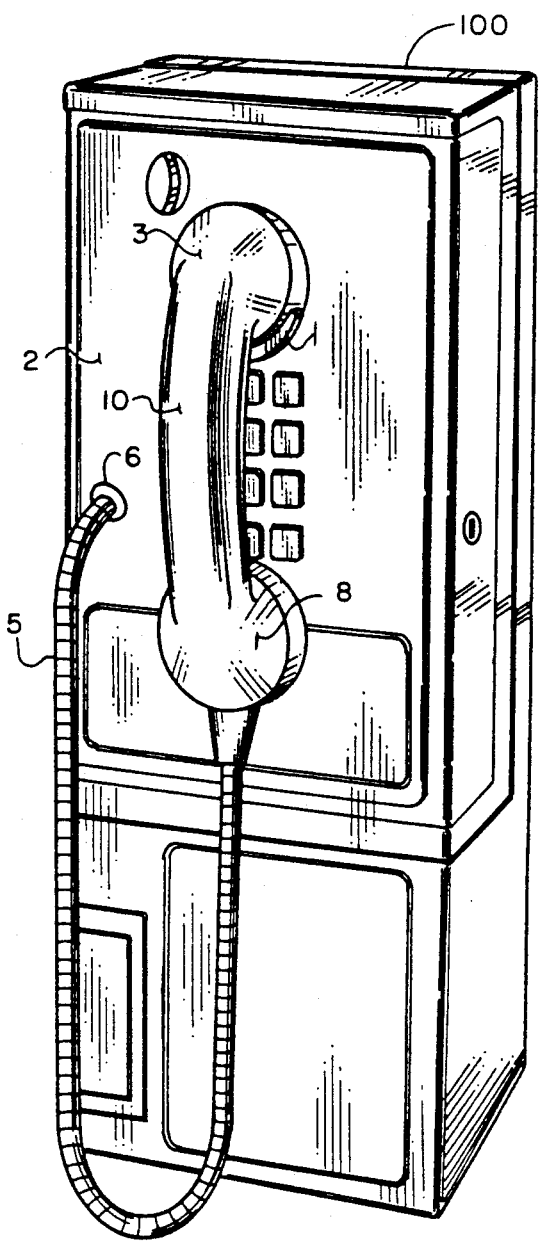
FIG. 1 is a perspective view of a public telephone showing an armored cord connecting a handset to the housing of a coin telephone.

Referring to FIG. 1 of the drawings, a housing 100 for a coin telephone supports a switchhook 1 which is located on front panel 2 of the housing. The housing 100 receives a handset cord 5 that extends from an opening 6 located on the front panel 2 of the telephone housing to the lower transmitter end 8 of handset 10. The handset cord 5 is covered by an armored outer sheath designed for maximum flexibility. This sheath typically is wrapped using an unpacked fully interlocking construction which makes it extremely difficult to break the cord upon twisting. The outer surface of the cord, because of the armoring, is also resistant to penetration by objects such as pins or knife blades. Not obvious in the present drawing is the fact that the cord 5 also includes within the sheath a plurality of insulated interior conductors for carrying electrical signals between the housing and the handset and a strength cable that extends throughout the length of the cord and is secured both in the handset and by means of the bracket of the present invention within the housing 100 behind opening 6.

Figure 2:
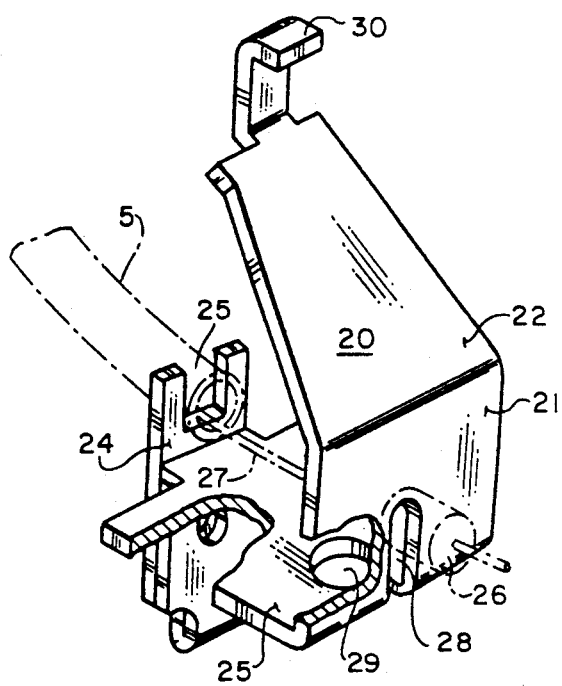
FIG. 2 is a perspective view of a retention bracket for securing armored telephone cord in the housing of a coin telephone.

FIG. 2 shows in detail the terminating arrangement of the sheath 5 inside the telephone housing.

Figure 3:
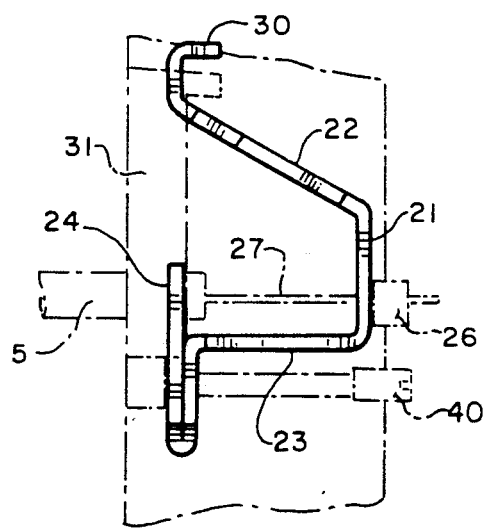
FIG. 3 is a partial sectional view of a coin telephone housing showing a retention bracket in accordance with the present invention mounted therein.
Figure 4:
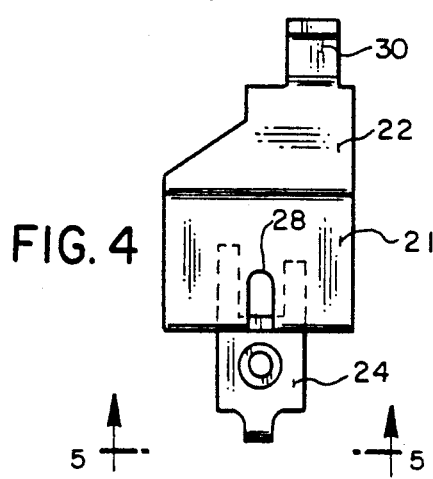
FIG. 4 is an end view of a retention bracket in accordance with the present invention.
Figure 5:
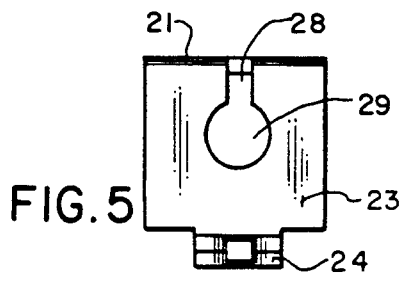
FIG. 5 is a sectional view of a retention bracket in accordance with the present invention taken along lines 5—5 of FIG. 4.

FIG. 3 shows in detail the terminating arrangement of the armored cabled sheath 5 and the internal handset lanyard 27 inside of the coin telephone housing. As can be seen, the lanyard with its slug 26 are engaged in vertical member 21 of the bracket 20 while the armored cable is crimped within the forward portion of the bracket. The bracket 20 is secured in place to the dial housing 31 by means of screw 40 and the hook portion 30 engaging a tab on the rear of the dial housing. As noted, the bracket is made of high tensile steel or similar material to withstand substantial shock or pressure. The bracket itself consists of a U-shaped portion 25 in the vertical plane which is adapted to grasp or encircle the outer sheath 5 of the armored cable. A double layer of vertical structure 24 extends past the U-shape to a horizontal plane 23 and from thence to the rear 21 where a circle 29 and slot 28 are available for retaining the armored cable portion the slot and particularly for anchoring the stop 26 located on the end of the armored cable 5. This latter portion all being in a vertical surface extending in a vertical direction upward from the horizontal portion 23. Extending at an angle from the vertical portion upward with a hook 30 on its termination is another portion 22 which engages a tab located on the rear of the dial housing 31.

As may be seen by reference to the foregoing, it is a simple matter to place the bracket 20 into the coin telephone housing 100 securing it to rear of the dial housing 31 and then bringing the armored sheath 5 of the armored paystation cable into the front of the paystation anchoring the outer armored cable portion 5 in the U-shaped section 25 and then engaging the stop 26 on the end of the armored cable in the opening 28 at the end 21 of the bracket 20. In this manner, a secure and effective retention of the armored cable is maintained within the coin telephone housing and at the same time providing maximum protection from vandalism or external damage to the telephone paystation.

While but a single embodiment of the present invention has been shown it will be obvious to those skilled in the art that numerous modifications may be made without departing from the spirit of the invention which shall be limited only by the scope of the claims appended hereto.

What is claimed is:

1. A bracket for mounting within a telephone paystation to retain a telephone handset armored cable of the type including a central cable terminated at at least a first end in a stop secured to said cable, and with an armored sheath encircling said cable, said bracket comprising:

a first vertical section positioned in a first plane, including a first opening therein adapted to receive and grasp said armored cable sheath within said telephone paystation;

said first vertical section further including a second opening for receiving a fastener for securing said bracket within said telephone paystation;

said bracket further including a first horizontal section extending at right angles from said first vertical section and including a third opening therein having a dimension greater than the width of said stop secured to said cable;

a second vertical section extending upward at right angles from said horizontal section and including a fourth opening communicating with said third opening;

said fourth opening being smaller in width than said stop affixed to said cable and greater in width than the diameter of said cable;

an angularly inclined section extending upward from said second vertical section in a direction towards the plane of said first vertical section and including a hook-like section on a distant end thereof adapted to engage a portion of said telephone paystation.

2. A bracket as claimed in claim 1 wherein:
said first vertical section includes front and rear portions, with said rear portion abutting said front portion.

3. A bracket as claimed in claim 2 wherein:
said first opening is included in said front portion.

4. A bracket as claimed in claim 3 wherein:
said first opening is U-shaped.

5. A bracket as claimed in claim 2 wherein:
said second opening extends through said front and rear portions.

6. A bracket as claimed in claim 1 wherein:
said third opening included in said horizontal section is round.

7. A bracket as claimed in claim 1 wherein:
said fourth opening included in said second vertical section is U-shaped.

8. A bracket as claimed in claim 1 wherein:
said bracket is constructed of cold-rolled steel.

* * * * *